United States Patent

[11] 3,634,198

[72] Inventor Andrew Truhan
R. D. #3 Box 392 T, Somerset, N.J. 08873
[21] Appl. No. 708,513
[22] Filed Feb. 27, 1968
[45] Patented Jan. 11, 1972

[54] DETECTION OF URINARY TRACT INFECTIONS
5 Claims, No Drawings

[52] U.S. Cl. .................................................... 195/100,
195/103.5, 23/253, 23/230
[51] Int. Cl. ........................................................ C12k 1/04
[50] Field of Search ............................................ 195/103.5,
100; 23/253, 230

[56] References Cited
UNITED STATES PATENTS
3,122,480  2/1964  Turner et al. ................ 195/103.5
3,378,346  4/1968  Watson et al. ............... 195/103.5 X OTHER REFERENCES
"Chemical Abstracts," 61:10983 a 1964

Munch et al., " J. Pharmaceutical Sciences," 53:832– 3, 1963
Bailey et al., Diagnostic Microbiology 2nd Ed. 1966 p. 329
Rider et al., " Analytical Chemistry" 18:96–99 1946

Primary Examiner—Lionel M. Shapiro
Assistant Examiner—Max D. Hensky
Attorney—Stowell & Stowell ABSTRACT: Compositions and devices for the detection of urinary tract infections are provided by dry solid mixtures of approximately equimolecular amounts of arylaminosulfonic acids or their water soluble salts and arylamines or their water soluble acid additions salts together with a strong normally solid organic carboxylic acid in an amount sufficient to produce and maintain an acid reaction in the presence of sufficient urine to wet the test sample. The compositions may be carried on or in a bibulous swab or a strip of bibulous material or they may be compressed into tablets or contained in urine soluble capsules. The compositions produce strong colorations when wetted with nitrite-containing urine.

DETECTION OF URINARY TRACT INFECTIONS

This invention relates to compositions for detecting infections in the urinary tract and to testing devices containing the same.

It has been found that dry solid mixtures of approximately equimolecular amounts of arylaminosulfonic acids or their water soluble salts and arylamines or their water soluble acid addition salts, together with a strong normally solid organic carboxylic acid in an amount sufficient to produce and maintain an acid reaction in the presence of sufficient urine to wet the test composition, show an immediate strong coloration if a nitrite-producing infection exists in the urinary tract from which the urine was derived.

Suitable arylaminosulfonic acids are 7-amino-1-naphthol-3-sulfonic acid and sulfanilic acid and suitable arylamines are benzidine and 1-naphthylamine.

The test composition may be carried on or in a bibulous material such as a cellulosic swab (e.g., a "Q-Tip") or a strip of paper or other bibulous material or it may be compressed into a tablet or dispensed in a urine soluble capsule such as a gelatin capsule. The devices should be maintained in a cool dry environment in the absence of strong light until used.

For example, test swabs may be made by immersing the mat ends of stick-mounted cellulosic swabs about three-sixteenths inch by three-eighths inch in size in an aqueous methanolic solution of 7-amino-1-naphthol-3-sulfonic acid, benzidine and oxalic acid in such concentrations that the swab after drying contains about 24 mg. of the aminonaphtholsulfonic acid, 18 mg. of benzidine and 30 mg. of oxalic acid.

A similar composition may be made into tablets of like content using a binder-diluent such as starch, for example, or the dry mixture of the aminonaphtholsulfonic acid, benzidine and oxalic acid may be filled into capsules of gelatin or other urine soluble material.

A few drips of urine placed on the swab or tablet will produce an immediate violet color if a urinary tract infection by a nitrite-producing organism exists, or the swab or other bibulous carrier may be immersed in a small amount of the urine to be tested.

Similar compositions containing, for example, 19 mg. of sulfanilic acid, 14 mg. of alphanaphylamine and 30 mg. of oxalic acid to each test device produce a red coloration under similar conditions.

A small amount of hydroquinone, for example, 0.2 mg. in the amount of mixture set forth above, may be incorporated in the composition to prevent discoloration during manufacture or storage.

Instead of oxalic acid, other organic acids of comparable strength, such as malic or citric acids, may be used.

The dry compositions of the invention are stable under normal conditions of storage and rapidly produce strong colorations with very small amounts of nitrite-containing urine. They are particularly useful in testing for urinary tract infections by *Escherichia coli, staphylococci, Proteus vulgaris* and *Aerobacter aerogenes*.

I claim:

1. A composition for detecting urinary tract infections consisting essentially of a dry solid mixture of approximately equimolecular parts of 7-amino-1-naphthol-3-sulfonic acid and benzidine, and oxalic acid in an amount approximately equal by weight to said aminosulfonic acid and benzidine components.

2. A device for detecting urinary tract infections comprising a bibulous material impregnated with the composition of claim 1.

3. A device for detecting urinary tract infections as defined in claim 2 wherein the bibulous material is a swab of cellulosic fibers mounted on the end of a stick.

4. A device for detecting urinary tract infections comprising the composition of claim 1 compressed into a tablet.

5. A device for detecting urinary tract infections comprising the composition of claim 1 encapsulated in a urine soluble capsule.

* * * * *